US008213925B2

(12) United States Patent
Datta et al.

(10) Patent No.: US 8,213,925 B2
(45) Date of Patent: Jul. 3, 2012

(54) PROCESSING MESSAGES FROM A MOBILE COMPUTING DEVICE FOR DIAGNOSIS OR SERVICE SELECTION

(75) Inventors: Mainak Datta, Karnataka (IN); Sharang Waghmare, Sunnyvale, CA (US); Bharat Welingkar, Los Altos, CA (US); Jiji Nair, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1006 days.

(21) Appl. No.: 12/166,189

(22) Filed: Jul. 1, 2008

(65) Prior Publication Data
US 2010/0003967 A1    Jan. 7, 2010

(51) Int. Cl.
*H04W 24/00* (2009.01)

(52) U.S. Cl. .......................... 455/423; 455/424; 455/425

(58) Field of Classification Search ............... 455/422.1, 455/423, 424, 425
See application file for complete search history.

(56) References Cited

U.S. PATENT DOCUMENTS

| 6,694,235 | B2 * | 2/2004 | Akiyama | 701/33 |
|---|---|---|---|---|
| 6,745,011 | B1 * | 6/2004 | Hendrickson et al. | 455/67.11 |
| 6,792,269 | B2 * | 9/2004 | Boehmke | 455/424 |
| 6,975,705 | B2 * | 12/2005 | Boehmke et al. | 379/9.02 |
| 7,099,660 | B2 * | 8/2006 | Boehmke | 455/423 |
| 7,797,740 | B2 * | 9/2010 | Blom et al. | 726/21 |
| 2002/0123339 | A1 * | 9/2002 | Boehmke | 455/424 |
| 2006/0007901 | A1 * | 1/2006 | Roskowski et al. | 370/338 |
| 2007/0072599 | A1 * | 3/2007 | Romine et al. | 455/423 |

OTHER PUBLICATIONS

Library (computing), Wikipedia, printed on Mar. 12, 2008 from Internet address: http://en.wikipedia.org/wiki/Library_%28computing%29, 7 pages.
Class Token definition, printed on Mar. 13, 2008 from Internet address: http://hudson.zones.apache.org/hudson/job/Lucene-trunk/javadoc//org/apache/lucene/analysis/Token.html, 10 pages.
Lucene, Wikipedia, printed on Mar. 12, 2008 from Internet address: http://en.wikipedia.org/wiki/Lucene, 3 pages.
Information retrieval, Wikipedia, printed on Mar. 12, 2008 from Internet address: http://en.wikipedia.org/wiki/Information_retrieval, 1 page.

* cited by examiner

*Primary Examiner* — Tilahun B Gesesse

(57) ABSTRACT

Selecting a service for a mobile computing device includes receiving a message from the mobile computing device via a wireless network, storing data from the message, querying the data to identify a characteristic, selecting a service from a plurality of services based on the identified characteristic, and sending the selected service to the mobile computing device.

19 Claims, 8 Drawing Sheets

PROCESSING MESSAGES FROM A MOBILE COMPUTING DEVICE FOR DIAGNOSIS OR SERVICE SELECTION

BACKGROUND

Mobile computing devices, such as cellular phones, smart phones, and personal digital assistants can encounter failure events, such as a software crash. Further, these devices can be used in many different ways according to the preferences of the users thereof. The mobile devices can communicate wirelessly via a wireless network to a server computer, which can provide functions such as data backup, data restore, the provision of new applications, updating or upgrading software of the device, etc.

DETAILED DESCRIPTION OF THE EXEMPLARY EMBODIMENTS

Figure 1:
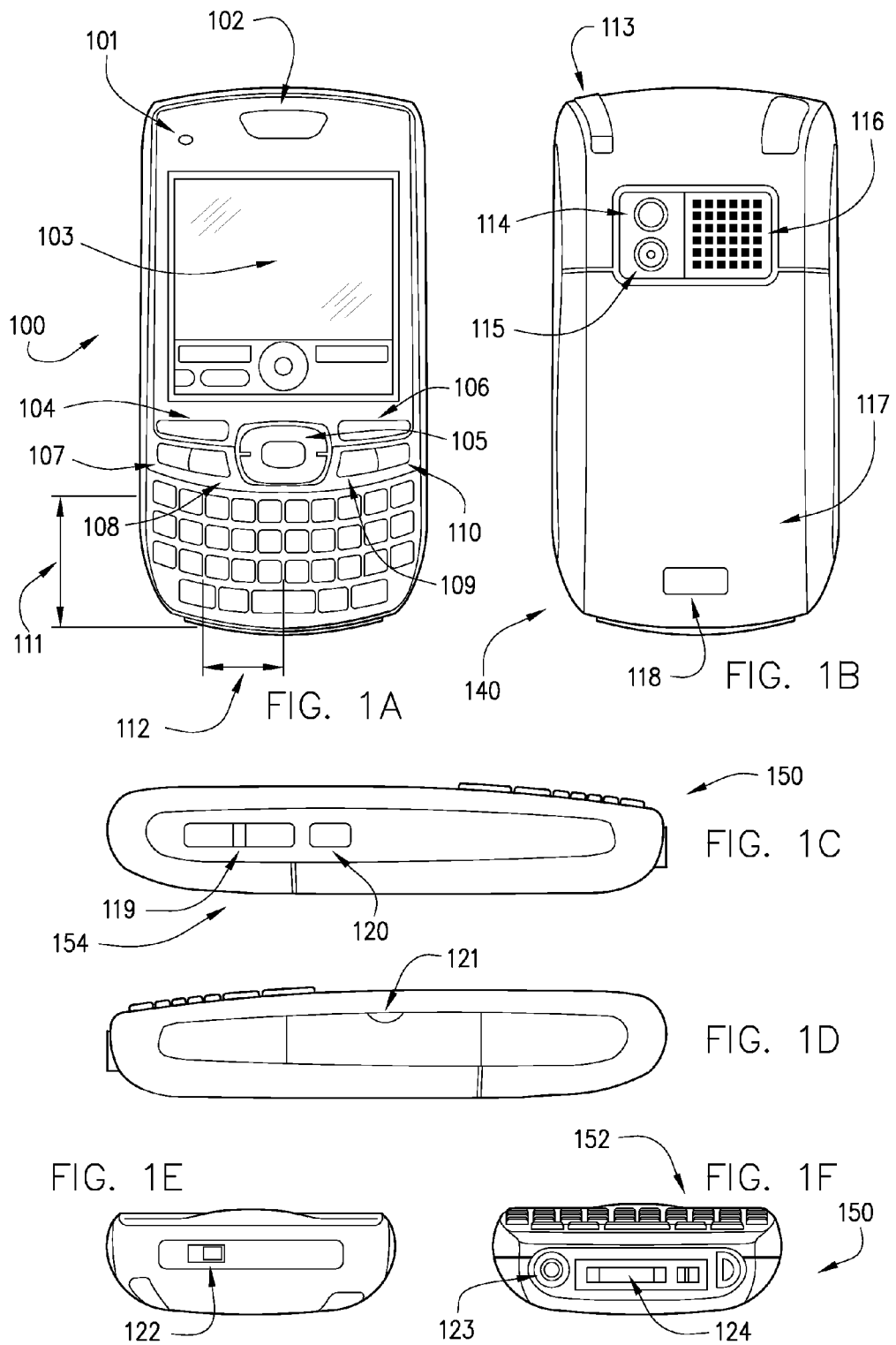
FIGS. 1A through 1F illustrate a mobile computing device from various views, according to an exemplary embodiment.

Described herein are various exemplary embodiments of systems and methods for analyzing trends, events, data logs and other data for one or more mobile computing devices. Some embodiments may provide greater flexibility in the type of diagnostics and trend analysis which can be performed. Some embodiments may enable early diagnosis and remedy or repair of device faults, bugs or failures. Some embodiments may further enable earlier and more accurate selection of a service needed by a mobile computing device. Some embodiments may allow analysis of usage trends of a mobile device or type of mobile device and may further enable selection and offering of services based on the determined usage trends.

The teachings herein extend to those embodiments that fall within the scope of the appended claims, regardless of whether they accomplish one or more of the above-mentioned exemplary advantages.

Referring to FIGS. 1A through 1F, a mobile computing device 100 is shown from various angles, according to an exemplary embodiment. FIG. 1A is a front view of device 100; FIG. 1B is a rear view of device 100; FIGS. 1C and 1D are side views of device 100; and FIGS. 1E and 1F are top and bottom views of device 100. The device may be any type of communications or computing device (e.g., a cellular phone, other mobile device, digital media player (e.g., audio or audio/video), personal digital assistant, etc.).

Device 100 may be a smart phone, which is a combination mobile telephone and handheld computer having personal digital assistant ("PDA") functionality. The teachings herein can be applied to other mobile computing devices (e.g., a laptop computer) or other electronic devices (e.g., a desktop personal computer, etc.). PDA functionality can comprise one or more of personal information management, database functions, word processing, spreadsheets, voice memo recording, location-based services, device backup and lock, media playing, Internet browsing, etc. and is configured to synchronize personal information or user data (e.g., contacts, e-mail, calendar, notes, to-do list, web browser favorites, etc.) from one or more applications with a computer (e.g., desktop, laptop, server, etc.). Device 100 is further configured to receive and operate additional applications provided to device 100 after manufacture, e.g., via wired or wireless download, Secure Digital card, etc.

Device 100 may be a handheld computer (e.g., a computer small enough to be carried in a typical front pocket found in a pair of pants or other similar pocket), comprising such devices as typical mobile telephones and PDAs, but the term "handheld" and the phrase "configured to be held in a hand during use" excluding typical laptop computers and tablet personal computers ("PCs") for purposes of this disclosure. In alternative embodiments, the teachings herein may extend to laptop computers, tablet PCs, desktop PCS, and other electronic devices. The various input devices and other parts of device 100 as described below may be positioned anywhere on device 100 (e.g., the front side of FIG. 1A, the rear side of FIG. 1B, the sides of FIGS. 1C and 1D, etc.).

Device 100 includes various user input devices. For example, the user input devices may include a send button 104 usable to select options appearing on display 103 and/or send messages, a 5-way navigator 105 usable to navigate through options appearing on display 103, a power/end button 106 usable to select options appearing on display 103 and to turn on display 103, a phone button 107 usable to access a phone application screen, a calendar button 108 usable to access a calendar application screen, a messaging button 109 usable to access a messaging application screen (e.g., e-mail, text, Multimedia Messaging Service (MMS), etc.), an applications button 110 usable to access a screen showing available applications, a thumb keyboard 111 (which includes a phone dial pad 112 usable to dial during a phone application), a volume button 119 usable to adjust the volume of audio output of device 100, a customizable button 120 which a user may customize to perform various functions, a ringer switch 122 usable to switch the device from one mode to another mode (such as switching from a normal ringer mode to a meeting ringer mode), and a touch screen display 103 usable to select control options displayed on display 103.

Device 100 also includes various audio circuits. The audio circuits may include phone speaker 102 usable to listen to information in a normal phone mode, external speaker 116 louder than the phone speaker (e.g. for listening to music, for a speakerphone mode, etc.), headset jack 123 to which a user can attach an external headset which may include a speaker and/or a microphone, and a microphone that can be used to pick up audio information such as the user's end of a conversation during a phone call.

Device 100 may also include a status indicator 101 that can be used to indicate the status of device 100 (such as messages pending, charging, low battery, etc.), a stylus slot 113 for receiving a stylus usable to input data on touch screen display 103, a digital camera 115 usable to capture images, a mirror 114 positioned proximate camera 115 such that a user may view themselves in mirror 114 when taking a picture of themselves using camera 115, a removable battery 118, and a connector 124 which can be used to connect device 100 to either (or both) an external power supply such as a wall outlet or battery charger or an external device such as a personal computer, a global positioning system ("GPS") unit, a display unit, or some other external device.

Device 100 may also include an expansion slot 121 that may be used to receive a memory card and/or a device which communicates data through slot 121, and a Subscriber Identity Module (SIM) card slot 117, located behind battery 118, configured to receive a SIM card or other card that allows the user to access a cellular network.

In various embodiments device 100 may include a housing 140. Housing 140 may be configured to retain or secure a screen in a fixed relationship above a plurality of user input devices in a substantially parallel or same plane. A fixed relationship may exclude a hinged or movable relationship between the screen and plurality of keys in the fixed embodiment, though hinged or movable relationships may be used in other embodiments.

Housing 140 could be any size, shape, and dimension. In some embodiments, housing 140 has a width 152 (shorter dimension) of no more than about 200 mm or no more than about 100 mm. According to some of these embodiments, housing 140 has a width 152 of no more than about 85 mm or no more than about 65 mm. According to some embodiments, housing 140 has a width 152 of at least about 30 mm or at least about 50 mm. According to some of these embodiments, housing 140 has a width 152 of at least about 55 mm.

In some embodiments, housing 140 has a length 154 (longer dimension) of no more than about 200 mm or no more than about 150 mm. According to some of these embodiments, housing 140 has a length 154 of no more than about 135 mm or no more than about 125 mm. According to some embodiments, housing 140 has a length 154 of at least about 70 mm or at least about 100 mm. According to some of these embodiments, housing 140 has a length 154 of at least about 110 mm.

In some embodiments, housing 140 has a thickness 150 (smallest dimension) of no more than about 150 mm or no more than about 50 mm. According to some of these embodiments, housing 140 has a thickness 150 of no more than about 30 mm or no more than about 25 mm. According to some embodiments, housing 140 has a thickness 150 of at least about 10 mm or at least about 15 mm. According to some of these embodiments, housing 140 has a thickness 150 of at least about 50 mm. According to some embodiments, housing 140 has a thickness 150 of 11 mm or less.

In some embodiments, housing 140 has a volume of up to about 2500 cubic centimeters and/or up to about 1500 cubic centimeters. In some of these embodiments, housing 140 has a volume of up to about 1000 cubic centimeters and/or up to about 600 cubic centimeters.

Device 100 may include an antenna 130 system for transmitting and/or receiving radio frequency signals. Each transceiver of device 100 may include individual antennas or may include a common antenna 130. The antenna system may include or be implemented as one or more internal antennas and/or external antennas.

While described with regards to a handheld device, many embodiments are usable with portable devices which are not handheld and/or with non-portable devices/systems.

Device 100 may provide voice communications functionality in accordance with different types of cellular radiotelephone systems. Examples of cellular radiotelephone systems may include Code Division Multiple Access ("CDMA") cellular radiotelephone communication systems, Global System for Mobile Communications ("GSM") cellular radiotelephone systems, etc.

In addition to voice communications functionality, device 100 may be configured to provide data communications functionality in accordance with different types of cellular radiotelephone systems. Examples of cellular radiotelephone systems offering data communications services may include GSM with General Packet Radio Service ("GPRS") systems ("GSM/GPRS"), CDMA/1×RTT (1 times Radio Transmission Technology) systems, Enhanced Data Rates for Global Evolution ("EDGE") systems, Evolution Data Only or Evolution Data Optimized ("EV-DO") systems, etc.

Device 100 may be configured to provide voice and/or data communications functionality through wireless access points ("WAPs") in accordance with different types of wireless network systems. A wireless access point may comprise any one or more components of a wireless site used by device 100 to create a wireless network system that connects to a wired infrastructure, such as a wireless transceiver, cell tower, base station, router, cables, servers, or other components depending on the system architecture. Examples of wireless network systems may further include a wireless local area network ("WLAN") system, wireless metropolitan area network ("WMAN") system, wireless wide area network ("WWAN") system (e.g., a cellular network), and so forth. Examples of suitable wireless network systems offering data communications services may include the Institute of Electrical and Electronics Engineers ("IEEE") 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, a wireless personal area network ("PAN") system, such as a Bluetooth® system operating in accordance with the Bluetooth Special Interest Group ("SIG") series of protocols.

Figure 2:
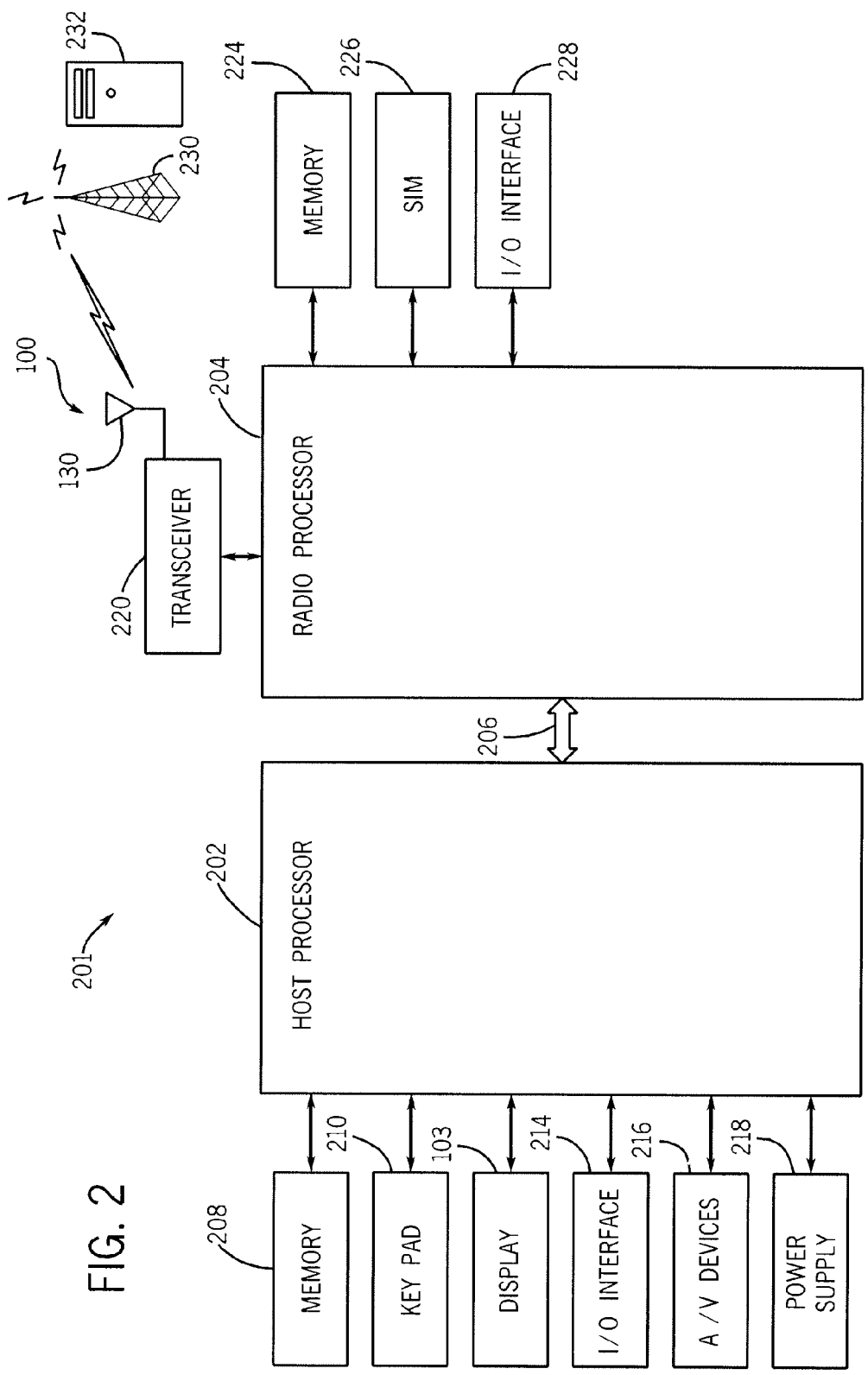
FIG. 2 is a block diagram of the mobile computing device of FIGS. 1A through 1F, according to an exemplary embodiment.

As shown in the embodiment of FIG. 2, device 100 comprises a processing circuit 201, which may comprise a dual processor architecture, including a host processor 202 and a radio processor 204 (e.g., a base band processor or modem). Host processor 202 and radio processor 204 may be configured to communicate with each other using an interface 206 such as one or more universal serial bus ("USB") interfaces, micro-USB interfaces, universal asynchronous receiver-transmitter ("UART") interfaces, general purpose input/output ("GPIO") interfaces, control/status lines, control/data lines, shared memory, and so forth.

Host processor 202 may be configured to execute various computer programs (e.g., software, firmware, or other code) such as application programs and system programs to provide computing and processing operations for device 100. Radio processor 204 may be responsible for performing various voice and data communications operations for device 100 such as transmitting and receiving voice and data information over one or more wireless communications channels. Although embodiments of the dual processor architecture may be described as comprising host processor 202 and radio processor 204 for purposes of illustration, the dual processor architecture of device 100 may comprise one processor, more than two processors, may be implemented as a dual- or multi-core chip with both host processor 202 and radio processor 204 on a single chip, etc. Alternatively, a single processor or multiple processors may perform the functions of host processor 202 and radio processor 204, such as a single, unified processor that handles host and radio functions, or other multiprocessor topologies which do not rely on the concept of a host. Alternatively, processing circuit 201 may comprise any digital and/or analog circuit elements, comprising discrete and/or solid state components, suitable for use with the embodiments disclosed herein.

In various embodiments, host processor 202 may be implemented as a host central processing unit ("CPU") using any suitable processor or logic device, such as a general purpose processor. Host processor 202 may comprise, or be implemented as, a chip multiprocessor ("CMP"), dedicated processor, embedded processor, media processor, input/output ("I/O") processor, co-processor, field programmable gate array ("FPGA"), programmable logic device ("PLD"), or other processing device in alternative embodiments.

Host processor 202 may be configured to provide processing or computing resources to device 100. For example, host processor 202 may be responsible for executing various computer programs such as application programs and system programs to provide computing and processing operations for device 100. Examples of application programs may include, for example, a telephone application, voicemail application, e-mail application, instant message ("IM") application, short message service ("SMS") application, multimedia message service ("MMS") application, web browser application, personal information manager ("PIM") application (e.g., contact management application, calendar application, scheduling application, task management application, web site favorites or bookmarks, notes application, etc.), word processing application, spreadsheet application, database application, video player application, audio player application, multimedia player application, digital camera application, video camera application, media management application, a gaming application, and so forth. The application software may provide a graphical user interface ("GUI") to communicate information between device 100 and a user. The computer programs may be stored as firmware on a memory associated with processor 202, may be loaded by a manufacturer during a process of manufacturing device 100, and may be updated from time to time with new versions or software updates via wired or wireless communication.

System programs assist in the running of a computer system. System programs may be directly responsible for controlling, integrating, and managing the individual hardware components of the computer system. Examples of system programs may include, for example, an operating system ("OS"), a kernel, device drivers, programming tools, utility programs, software libraries, an application programming interface ("API"), a GUI, and so forth. Device 100 may utilize any suitable OS in accordance with the described embodiments such as a Palm OS®, Palm OS® Cobalt, Microsoft Windows® OS, Microsoft Windows® CE, Microsoft Pocket PC, Microsoft Mobile, Symbian OS™, Embedix OS, any Linux distribution, Binary Run-time Environment for Wireless ("BREW") OS, JavaOS, a Wireless Application Protocol ("WAP") OS, and so forth.

Device 100 may comprise a memory 208 coupled to host processor 202. In various embodiments, memory 208 may be configured to store one or more computer programs to be executed by host processor 202. Memory 208 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory ("RAM"), dynamic RAM ("DRAM"), Double-Data-Rate DRAM ("DDRAM"), synchronous DRAM ("SDRAM"), static RAM ("SRAM"), read-only memory ("ROM"), programmable ROM ("PROM"), erasable programmable ROM ("EPROM"), electrically erasable programmable ROM ("EEPROM"), flash memory (e.g., NOR or NAND flash memory), or any other type of media suitable for storing information.

Although memory 208 is shown as being separate from host processor 202 for purposes of illustration, in various embodiments some portion or the entire memory 208 may be included on the same integrated circuit as host processor 202. Alternatively, some portion or the entire memory 208 may be disposed on an integrated circuit or other medium (e.g., hard disk drive) external to the integrated circuit of host processor 202. In various embodiments, device 100 may comprise a memory port or expansion slot 121 (shown in FIG. 1) to support a multimedia and/or memory card, for example. Processing circuit 201 may use memory port or expansion slot 121 to read and/or write to a removable memory card having memory, for example, to determine whether a memory card is present in port or slot 121, to determine an amount of available memory on the memory card, to store subscribed content or other data or files on the memory card, etc.

Device 100 may comprise a user input device 210 coupled to the host processor 202. User input device 210 may comprise, for example, a alphanumeric, numeric or QWERTY key layout and an integrated number dial pad. Device 100 also may comprise various keys, buttons, and switches such as, for example, input keys, preset and programmable hot keys, left and right action buttons, a navigation button such as a multi-directional navigation button, phone/send and power/end buttons, preset and programmable shortcut buttons, a volume rocker switch, a ringer on/off switch having a vibrate mode, a keypad and so forth. Examples of such objects are shown in FIG. 1 as 5-way navigator 105, power/end button 106, phone button 107, calendar button 108, messaging button 109, applications button 110, thumb keyboard 111, volume button 119, customizable button 120, and ringer switch 122.

The host processor 202 may be coupled to display 103. Display 103 may comprise any suitable visual interface for displaying content to a user of device 100. For example, display 103 may be implemented by a liquid crystal display ("LCD") such as a touch-sensitive color (e.g., 16-bit color) thin-film transistor ("TFT") LCD screen. In some embodiments, the touch-sensitive LCD may be used with a stylus and/or a handwriting recognizer program.

Device 100 may comprise an I/O interface 214 coupled to the host processor 202. I/O interface 214 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a PC, or a remote computer system, such as a computer server. In various implementations, device 100 may be configured to transfer and/or synchronize information with the local computer system, such as personal information management data stored in one or more databases in memory 208.

Host processor 202 may be coupled to various audio/video ("A/V") devices 216 that support A/V capability of device 100. Examples of A/V devices 216 may include, for example, a microphone, one or more speakers, an audio port to connect an audio headset, an audio coder/decoder (codec), an audio player, a digital camera, a video camera, a video codec, a video player, and so forth.

Host processor 202 may be coupled to a power supply 218 configured to supply and manage power to the elements of device 100. In various exemplary embodiments, power supply 218 may be implemented by a rechargeable battery, such as a removable and rechargeable lithium ion battery to provide direct current ("DC") power, and/or an alternating current ("AC") adapter to draw power from a standard AC main power supply.

As mentioned above, radio processor 204 may perform voice and/or data communication operations for device 100. For example, radio processor 204 may be configured to communicate voice information and/or data information over one or more assigned frequency bands of a wireless communication channel. Radio processor 204 may be implemented as a communications processor using any suitable processor or logic device, such as a modem processor or baseband processor. Radio processor 204 may comprise, or be implemented as, a digital signal processor ("DSP"), a media access control ("MAC") processor, or any other type of communications processor in accordance with the described embodiments. Radio processor 204 may be any of a plurality of modems manufactured by Qualcomm, Inc. or other manufacturers.

Device 100 may comprise a transceiver 220 coupled to radio processor 204. Transceiver 220 may comprise one or more transceivers configured to communicate using different types of protocols, communication ranges, operating power requirements, RF sub-bands, information types (e.g., voice or data), use scenarios, applications, and so forth. For example, transceiver 220 may comprise a Wi-Fi transceiver and a cellular or WAN transceiver configured to operate simultaneously.

Transceiver 220 may be implemented using one or more chips as desired for a given implementation. Although transceiver 220 is shown as being separate from and external to radio processor 204 for purposes of illustration, in various embodiments some portion or the entire transceiver 220 may be included on the same integrated circuit as radio processor 204.

Device 100 may comprise an antenna or antenna system 130 for transmitting and/or receiving electrical signals. As shown, antenna system 130 may be coupled to radio processor 204 through transceiver 220. Radio tower 230 and server 232 are shown as examples of potential objects configured to receive a signal from antenna system 130.

Device 100 may comprise a memory 224 coupled to radio processor 204. Memory 224 may be implemented using any type of memory described with reference to memory 208. Although memory 224 is shown as being separate from and external to radio processor 204 for purposes of illustration, in various embodiments some portion or the entire memory 224 may be included on the same integrated circuit as radio processor 204. Further, host processor 202 and radio processor 204 may share a single memory.

Device 100 may comprise a SIM 226 coupled to radio processor 204. SIM 226 may comprise, for example, a removable or non-removable smart card configured to encrypt voice and data transmissions and to store user-specific data for allowing a voice or data communications network to identify and authenticate the user. SIM 126 also may store data such as personal settings specific to the user.

Device 100 may comprise an I/O interface 228 coupled to the radio processor 204. I/O interface 228 may comprise one or more I/O devices to enable wired (e.g., serial, cable, etc.) and/or wireless (e.g., WiFi, short range, etc.) communication between device 100 and one or more external computer systems.

In various embodiments, device 100 may comprise location or position determination capabilities. Device 100 may employ one or more position determination techniques including, for example, GPS techniques, Cell Global Identity ("CGI") techniques, CGI including timing advance ("TA") techniques, Enhanced Forward Link Trilateration ("EFLT") techniques, Time Difference of Arrival ("TDOA") techniques, Angle of Arrival ("AOA") techniques, Advanced Forward Link Trilateration ("AFTL") techniques, Observed Time Difference of Arrival ("OTDOA"), Enhanced Observed Time Difference ("EOTD") techniques, Assisted GPS ("AGPS") techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc.

In various embodiments, device 100 may comprise dedicated hardware circuits or structures, or a combination of dedicated hardware and associated software, to support position determination. For example, transceiver 220 and antenna system 130 may comprise GPS receiver or transceiver hardware and one or more associated antennas coupled to radio processor 204 to support position determination.

Host processor 202 may comprise and/or implement at least one location-based service ("LBS") application. In general, the LBS application may comprise any type of client application executed by host processor 202, such as a GPS application configured to communicate position requests (e.g., requests for position fixes) and position responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest ("POI") such as restaurants, hotels, landmarks, and entertainment venues, and other types of LBS services in accordance with the described embodiments.

Radio processor 204 may be configured to generate a position fix by configuring a position engine and requesting a position fix. For example, a position engine interface on radio processor 204 may set configuration parameters that control the position determination process. Examples of configuration parameters may include, without limitation, location determination mode (e.g., standalone, Mobile Station-assisted, Mobile Station-based), actual or estimated number of position fixes (e.g., single position fix, series of position fixes, request position assist data without a position fix), time interval between position fixes, Quality of Service ("QoS") values, optimization parameters (e.g., optimized for speed, accuracy, or payload), Position Determination Entity address (e.g., IP address and port number of LPS or MPC), etc. In one embodiment, the position engine may be implemented as a QUALCOMM® gpsOne® engine.

Figure 3:
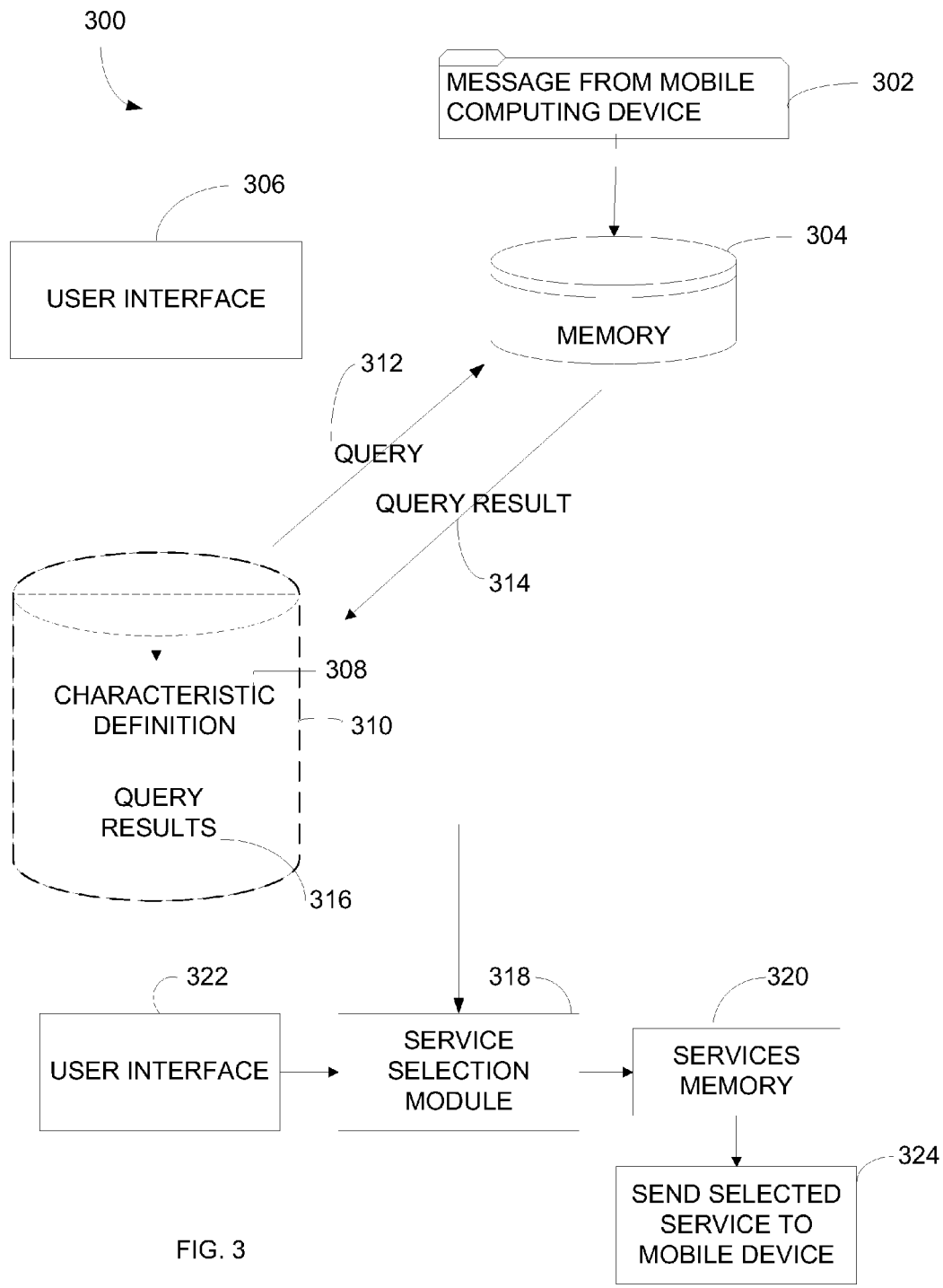
FIG. 3 is a block diagram of a system and method for processing messages from a mobile computing device, according to an exemplary embodiment.

Referring now to FIG. 3, a block diagram of a system and method for processing messages from one or more mobile computing devices will be described. System 300 may be operable on one or more server computers, such as server 232. Message 302 represents one or more messages being received from the one or more mobile computing devices, which messages may be received via a wireless network. For example, mobile device 100 may be configured to transmit messages over any of the wireless networks or communication links described herein for receipt by a server computer of a wireless service provider or wireless carrier, which may then route the messages via one or more other computers to system 300. Messages may be received from one mobile computing device, a plurality of mobile computing devices, mobile computing devices configured to operate on a particular wireless carrier's network, mobile computing devices having a particular model number and/or software version number, mobile computing devices that have signed-up, registered, or opted-in to services provided by system 300, etc. The messages are stored in a memory 304, which may be a database or any type of memory described herein. A user interface 306 is configured to interact with a user, who may be an agent or representative of a manufacturer of device 100, a wireless carrier, or other provider of system 300. User interface 306 is configured to receive a characteristic definition 308 from a user, the characteristic being a characteristic of the messages stored in memory 304, which represent a characteristic of devices 100. The characteristic may be, for example, an event, such as a trend or trending event or any other characteristic or attribute of interest to the user. An event may be any occurrence on one or more of devices 100, examples of which are described below. A trend may be a characteristic of a device over time, a characteristic of a group of devices which may or may not be over time, a tendency of a device or devices, the occurrence of certain events over devices or over time, a pattern of events or occurrences or usage of device 100, or other trends of devices 100 as represented by or recorded by data within messages 302. Each characteristic may comprise one or more attributes, which may be defined by a user, and which may comprise a key word representing a characteristic, a file type to be queried, a type of data to be queried, or other attributes of messages 302 or data stored therein. Characteristics 308 may be stored in a memory 310, which may be any type of memory described herein. In this embodiment, memory 310 comprises a characteristic database configured to store characteristic definitions and query results in a table or other form.

System 300 may be configured to run a query 312, which is based on the attributes of the characteristic definition, and may be in the form of one or more expressions. Query 312 may be run upon request from a user via user interface 306, periodically according to a predetermined period (e.g., every week, every day, every hour, every minute, etc.), in response to the occurrence of an event or a criteria being met (e.g., based on certain data identified from previous queries, in response to the manufacturer of device 100 completing a new software version, or other criteria or events). Query 312 is run against all or a subset of messages in memory 304. For example, expressions of query 312 may be applied to data in the messages or data based on the messages. In one embodiment, the data may have been extracted from the messages prior to querying and saved in the form of an index, in which case the query may be run against the index. The data can be words, keywords, tokens, patterns, or other data.

Query result 314 may comprise data from memory 304 and/or metadata or other data related to the data being queried. Query results are stored in a query result portion 316 of memory 310. While shown in this exemplary form in separate memories 304 and 310, the elements described herein may be stored in a single memory or database, or in more than two different memories.

A service selection module 318 is configured to review the query results 316 and to select a service from a plurality of services stored in services memory 320 for one or more mobile computing devices. The selection may be done under control of or per request from a user via a user interface 322 (which may be part of user interface 306 or a separate user interface) or may be done in response to the detection of a certain query result by service selection module 318, the presence of certain data, or other criteria or triggering events, which may occur automatically. According to one example, message 302 may comprise diagnostic data, such as a set of crash data and/or a log of data from processes which were operating on device 100 during a crash event or other failure of a process. In this example, message 302 is generated by device 100 in response to the failure of the process on device 100. Query 312 and query result 314 can determine a characteristic of the crash event which can then be analyzed by service selection module 318 to identify a service to remedy the failure, such as an upgrade of system software to a more recent version, a bug fix program, or other service. Process 324 represents a process to send the selected service to the mobile computing device, which may be done via a wireless network in a similar manner as messages were received at messages 302, but alternatively may be sent over a wired connection, by e-mail to device 100, by instructing a user to take one or more actions with device 100, etc.

System 300 can be applied in a diagnostics or crash recovery situation, or may alternatively be configured to identify other characteristics and/or select a service applicable for those characteristics. For example, the characteristic may be an event which occurs on a wireless device, such as an event of a wireless connection failure, in which device 100 has failed to connect to a wireless device, such as a Bluetooth headset, wireless Wi-Fi access point, a cellular network, or other network. The characteristic can relate to dropped calls, wherein a loss of a cellular network is experienced by device 100 during a telephone call. The characteristic may be a dropped data connection, which would be a similar loss of signal during the data communication, such a receiving an email, browsing the internet, etc. The characteristic may relate to a failure or crash of a personal information management application, such as a contacts, calendar, messaging, tasks, notes, or other application. The characteristic may relate to a use or non-use of the device such as a phone call, a lack of use of the device for a predetermined period of time, a power-related event such as low battery, a power start event, a battery at, below or above X % (e.g., 50%) event, or other events. The characteristic may relate to one or more failures of certain applications or types of applications, which may occur based on certain geography. The characteristic may relate to the presence of failures in certain use situations of device 100, which may define one or more user habits. The characteristic may relate to or be used to identify one or more frequent causes or types of failure (e.g., a top 10 types of failures), a number of failures or a number of failures of a particular type, etc. Other characteristics, trends or patterns of device or user behavior are contemplated.

Services memory 320 can comprise any of a number of different services which may be selected as being relevant, material, responsive, or of interest to device 100 or a user thereof based on the query results of system 300. For example, in addition to software upgrades, the services may comprise the offer of a software application not currently operating on device 100 when system 300 detects that a user may have a need for such application (e.g., a .pdf reader application after detecting a user failed to open a .pdf attachment to an email). As another example, a service may include an offer to upgrade software coupled with an offer for a discount on a fee associated with the service (e.g., free service use for x amount of time), etc. The selected service may be configured to remedy the failure in any of a number of ways, such as by fixing a bug in software or firmware, downloading new software or firmware, notifying the user via the display on device 100 of an irrecoverable failure, partially addressing the failure, etc.

Figure 4:
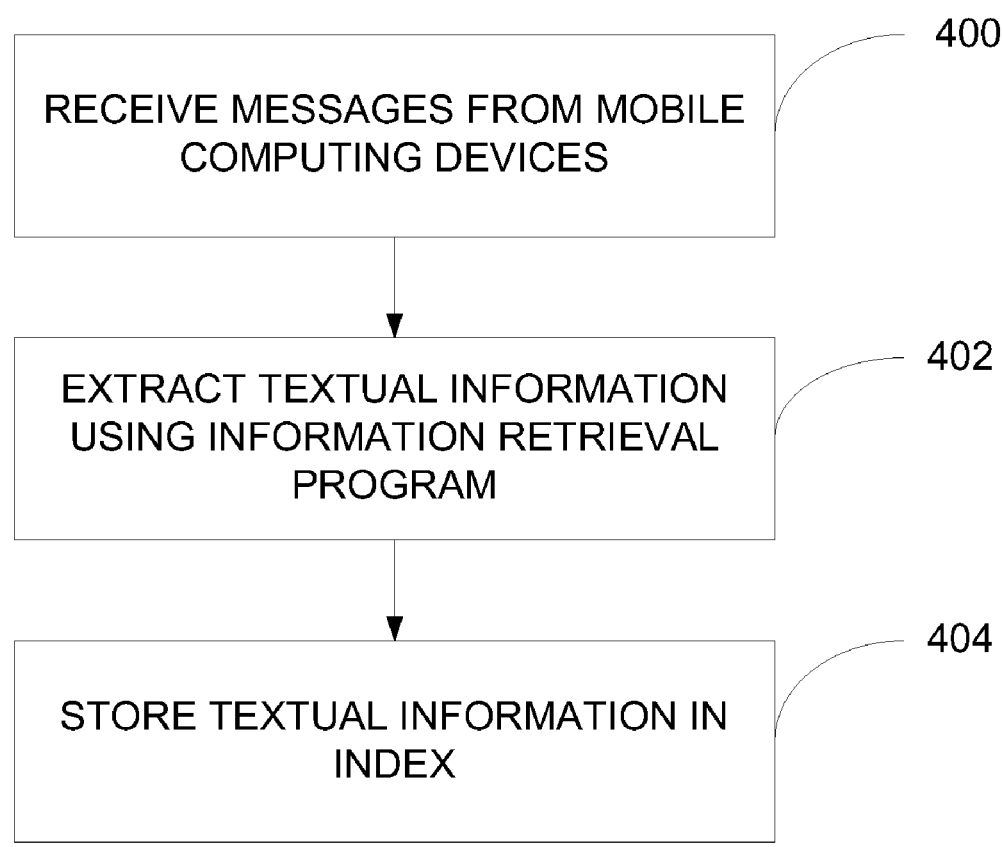
FIG. 4 is a flowchart showing processes for index creation, according to an exemplary embodiment.

Referring now to FIG. 4, an exemplary method for indexing data will be described. As mentioned with reference to FIG. 3, messages are stored in memory 304. In one exemplary embodiment, after messages are received at a step 400, data (e.g., textual information) may be extracted from one or more of the messages, which may further occur using an information retrieval program implemented with an information retrieval library. In one embodiment, a token-based indexing method may be used, though any method of indexing may be used in alternative embodiments. For example, indexing may comprise collecting, parsing, and/or storing data to facilitate information retrieval. At step 404, the extracted textual information may be stored in an index, for example, in memory 304.

In one example, extracted data from messages 302 may comprise tokens, which are an occurrence of a term from the text of a field in a document or file. The token may comprise the text. Alternatively, the token may comprise the text along with a start and/or end offset of the term in the text of the field. As a further alternative, the token may comprise a type string. In an embodiment in which offsets are included as part of the token, the offsets may be configured to permit applications to re-associate a token with its source text or to show matching text fragments. The token type may be a string assigned by a lexical analyzer or tokenizer which names a lexical syntactic class to which the token belongs. The token may optionally have metadata in other forms. According to one exemplary embodiment, an open source information retrieval library may be used, such as Lucene, developed by Apache Software Foundation, or alternatively other information retrieval libraries may be used. The Lucene information retrieval library uses the concept of a document containing fields of text, which allows its application programming interface to be independent of file format. Text from .pdf files, HTML files, Microsoft Word documents, and other file types can be indexed wherein the textual information can be extracted.

Figure 5:
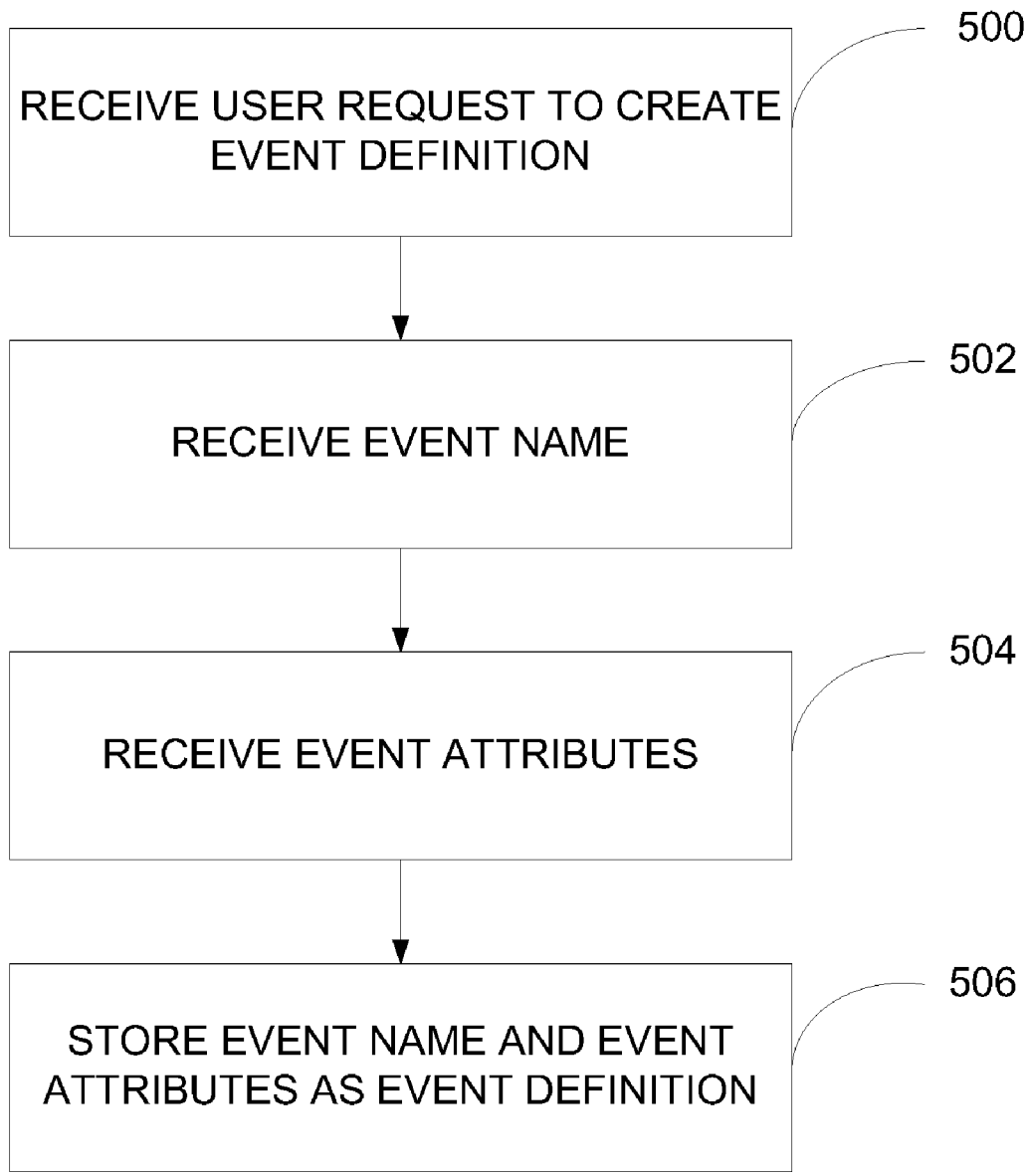
FIG. 5 is a flowchart showing processes for attribute selection, according to an exemplary embodiment.

Referring now to FIG. 5, an exemplary method of attribute selection for a characteristic definition (in this example, an event definition) will be described. As described with reference to FIG. 3, the user interface may be configured to receive a user request to create an event definition which is to include a set of attributes (step 500). The attributes may comprise data to be searched, which may be textual information, such as a pattern, token, word, such as keyword, etc. The attributes may also comprise a type of file to be searched (e.g., a log file, such as a system log, any text data file format, such as a text data file format known to a Linux-based operating system, etc., a text data file which has been indexed, etc.), or other attributes. At step 502, system 300 is configured to receive an event name from a user, which identifies the event or set of attributes being stored by the user. At step 504, system 300 is configured to receive one or more attributes to form the query to be run against the data from the messages. At step 506, system 300 is configured to store the event name and event attributes as an event definition in memory 310.

Figure 6:
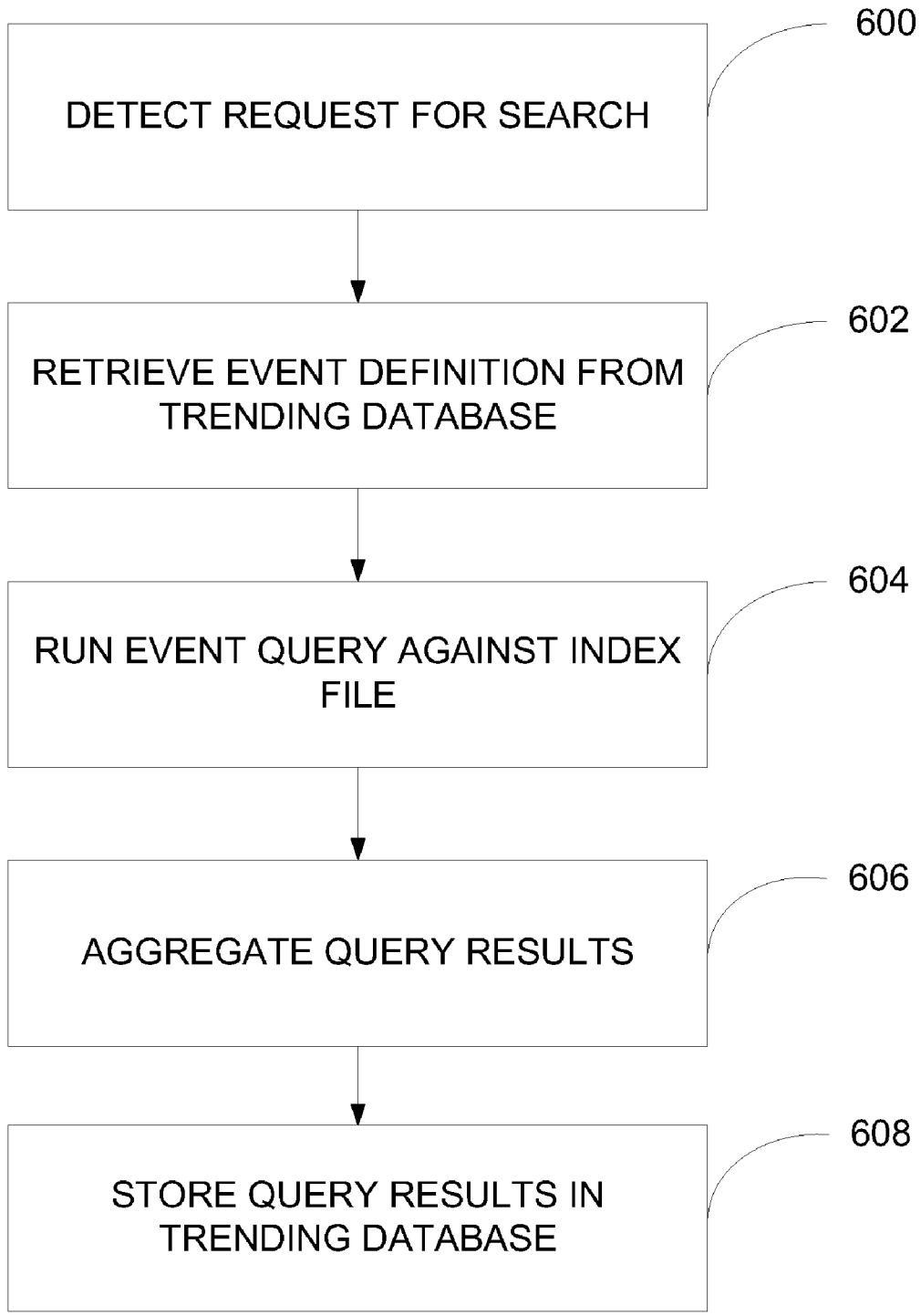
FIG. 6 is a flowchart showing search processes, according to an exemplary embodiment.

One or more characteristic definitions having different attribute sets can be created by a user and stored in memory 310. Each characteristic definition can be used to create one or more expressions that can be applied to the index (as shown in FIG. 6 below) to extract data out of the index file system and put the data in database 310 as query result 316, which can then be used for processing, such as analysis, such as trend analysis. A variety of event definitions can be created by a user to generate a variety of different reports or query results. The characteristic definitions may be configured to discover or develop a trend for a particular type of device 100 (e.g., model, wireless carrier associated with device 100, or model/carrier combination), a particular device, etc. A user can use a characteristic definition to define an event to record for training purposes. The event definition can be generic to any specific device event or device and may comprise an expression which can capture a plurality of occurrences or trend of occurrences of an event or attribute in the index. For example, one manner in which the event definition may be generic is in the case where one or more segmentation faults (or segfaults) or other type of faults at device A may be the same or substantially the same as segfaults at device B, wherein devices A and B may be of different models, types, or families. A segmentation fault may occur when a program attempts to perform a memory operation that it is not allowed to perform; however, other faults are contemplated. After running a report, additional event definitions may be created by the user for extracting additional query results based at least in part on query results from a first query. Another sense in which an event definition may be generic is that each event definition can be assigned any Lucene query, thus making the event definition generic in the way in which events are defined.

Referring now to FIG. 6, a method of searching or querying will be described according to an exemplary embodiment. At step 600, system 300 is configured to detect a request to execute a search query based on an event definition. The request may come from a user via user interface 306, or it may come from a process configured to periodically run a search or to run a search in response to a criteria or other event. At step 602, an event definition is retrieved from memory 310, which may be a trending database. At step 604, the event definition is run as one or more expressions against the data stored in memory 304 (e.g., an index file comprising tokens in one embodiment). The querying may comprise searching for keywords among the tokens to identify the characteristic that is the subject of the event definition. At step 606, query results are aggregated, for example, by collecting query results and storing them in a relational database. At step 608, query results are stored in memory 310 for further use by a user, a service selection module or other users or devices.

According to one embodiment, data from the messages is stored in the form of an index in memory 304 to provide a generic database against which queries can be run to generate a report. Queries may be run from time to time, on different days, and the extracted data can be stored in memory 310, which may be a database of trends or events, and which may create a generic schema which can be utilized for reporting purposes. Query results may comprise tokens, pointers to the actual log file or files so that the log file can be retrieved directly, and/or other data or metadata.

According to one embodiment, heuristics may be applied by a user through user interface 306 or by a process operable on system 300, or some combination thereof, which are designed to solve problems with one or more devices 100, by looking for specific attributes and characteristics of the devices based on searching the message data. Heuristics can be applied to do trending analysis and to identify characteristics, issues or occurrences that can be fixed or improved on device 100. Service selection module 318 can apply heuristics to select one or more services from services memory 320 to address the needs of device 100. For example, software updates can be sent if needed and if it is determined by system 300 that a software update will address an issue being encountered by one or more of devices 100. An event definition can be configured to correlate certain pieces of textual information from log files received by way of the messages from device 100 to come up with a conclusion as to what type of remedial service may be needed. Normalization can be done through the indexing process, and the event definitions can tell the indexing engine what kind of information to retrieve.

According to one exemplary embodiment, system 300 may provide an event query which may be generic to any of the tokens in the index and a database of attributes that can be extracted using plug in modules. Plug in modules are developed using generic expressions.

Figure 7:
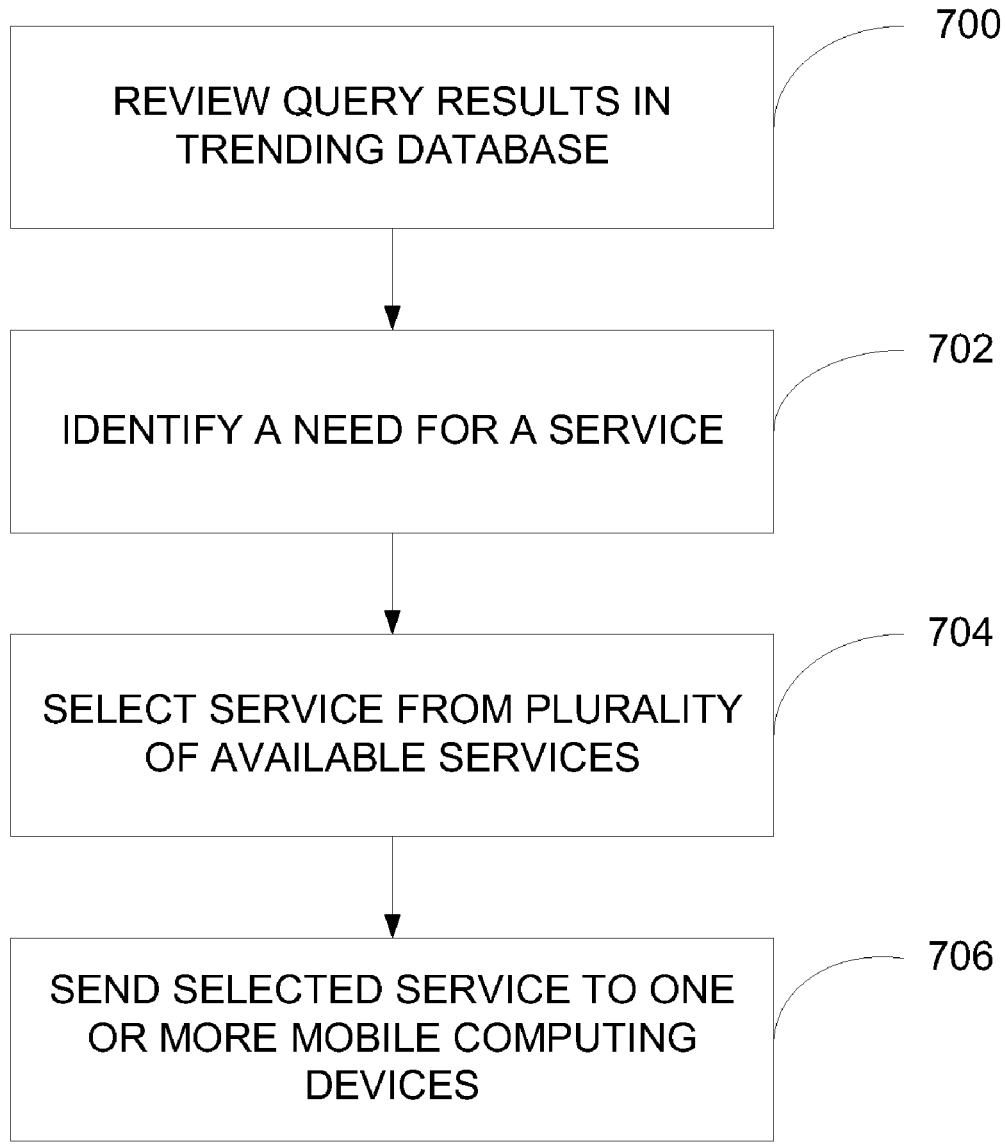
FIG. 7 is a flowchart showing service selection and delivery processes, according to an exemplary embodiment.

Referring now to FIG. 7, a method of service selection and delivery is disclosed. At step 700, service selection module 318 and/or a user may review query results in memory 310, which may be a trending database, to identify a need for a service, as shown in step 702. At step 704, a service is selected from a plurality of available services. At step 706, the selected service is sent to one or more mobile computing devices.

Figure 8:
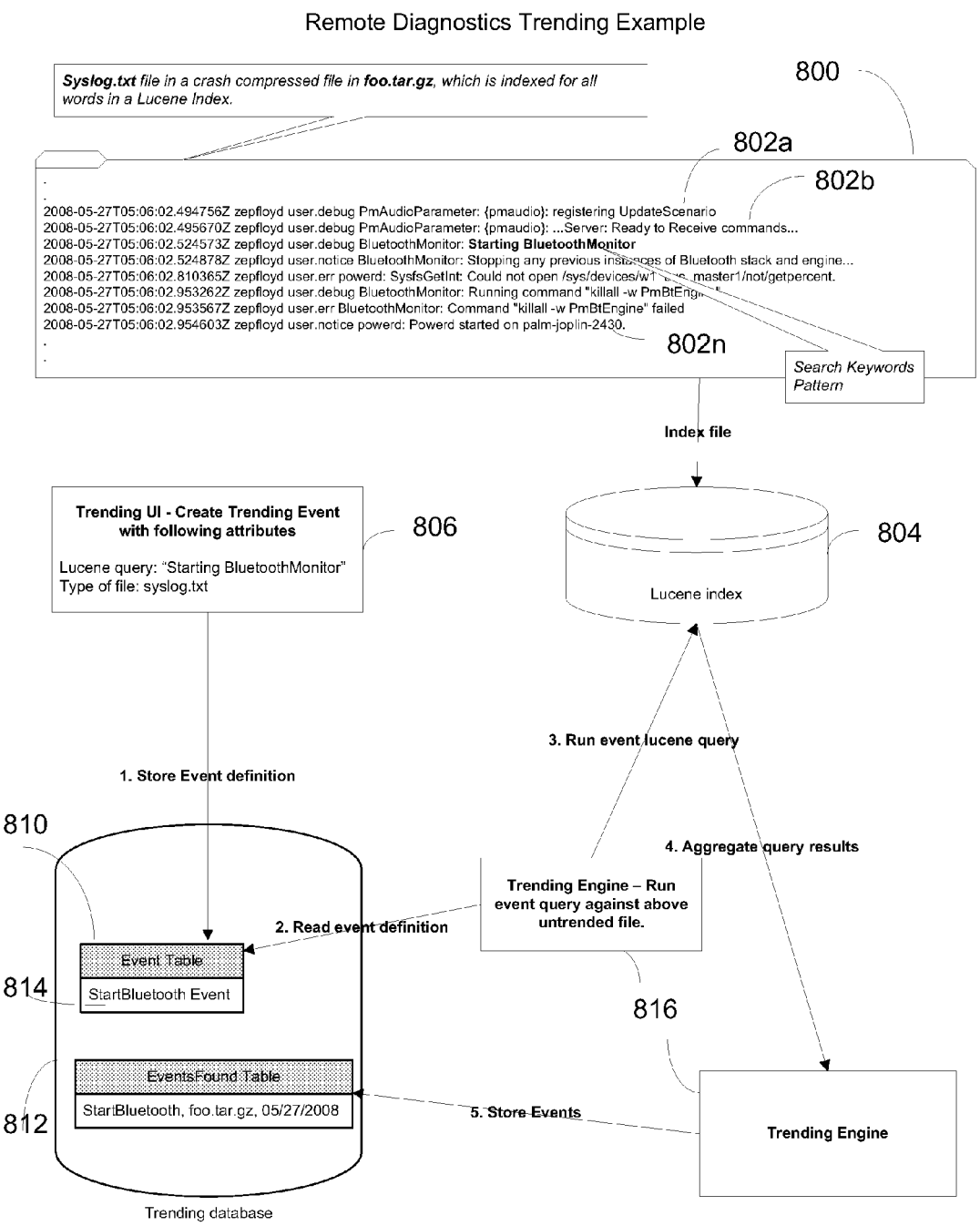
FIG. 8 is a block diagram of a remote diagnostics trending example, according to an exemplary embodiment.

Referring now to FIG. 8, a remote diagnostics trending example will be described. An exemplary message 800 is shown which, in this embodiment, is a log file related to a system crash event on a device 100. The log file is compressed, which may occur on device 100. In this case, the log file is a syslog.txt file and is in a Tar (tape archive) file format, which is a file format for distribution or archiving which may comprise file system information such as user end group permissions, dates, and directory structures. Message 800 comprises a file having a plurality of file entries, fields or records 802a, 802b, ... 802n, each entry comprising text. The text can be extracted to create an index file stored in this exemplary embodiment as a Lucene index 804. One exemplary token of the index is the token "Starting BluetoothMonitor." The Lucene index 804 may be a database which can be searched generically using expressions in an event definition. Each Lucene query expression is associated with an event's name, as described above, which is a key for a particular user-defined event. Message 800 is generated by device 100 and sent to system 300 upon or shortly after a crash event, but may alternatively be sent periodically. According to one example, an event definition can be constructed to determine what type of error happened that resulted in the crash event.

Two steps of extraction occur in the exemplary system of FIG. 8. First, tokens representing key words within message 800 are extracted to create the index file stored as Lucene index 804. Then, after querying, selected data is extracted from the Lucene index and/or other message data associated with the token in the Lucene index for aggregation as will be described hereinbelow. From time to time, additional messages may be received or extracted for indexing, and stored in Lucene index 804.

User interface 806 represents a user interface usable by a user to create trending events having certain attributes. For example, a trending event is created with a Lucene query attribute of "Starting BluetoothMonitor" and a type of file of "syslog.txt." This event definition is stored in an event table 810 within trending database 812 according to its event name 814, which is "StartBluetooth Event." Additional event definitions may be stored in the event table. Under control of a user or at a predetermined time, a trending engine 816 is configured to read one or more event definitions from trending database 812 and run one or more event definitions against Lucene index 804 as a Lucene query. Query results are aggregated by trending engine 816 and stored in trending database 812 in an EventsFound table. The query results are processed using pre-defined expressions and events are mined as an end result. The events may then be analyzed by a user or by software to identify trends and data.

According to one embodiment, message 800 may be indexed and data stored in tables as follows. Message 800, in a compressed format (e.g., a .tar.gz format, which may be a Tar file compressed using a compression utility such as gzip, bzip2, or compress) is uploaded to a remote diagnostics server. Message 800 comprises one or more files such as log files and other relevant files. The remote diagnostics server receives the file, uncompresses it and indexes each individual file within the Tar file as configured. A Lucene index 804 and the actual files are stored in a shared file system. Lucene index queries relating to particular string patterns in the indexed text files are identified and stored as trend events. For example, in a syslog.txt file, if the pattern of interest for identification is "Starting BluetoothMonitor," a trend event may be created through a user interface 806 to the remote diagnostics server, the trend event being associated with the following Lucene query: ".*Starting BluetoothMonitor.*" The trend event may be run against keyword patterns of message 800 to identify the pattern "Starting Bluetooth Monitor" in the field or record: "2008-05-27T05:06:02.524573Z user.debug BluetoothMonitor: Starting BluetoothMonitor." The trend event queries are run against index 804 and if any matches are found, database entries are made to note the particular event was found in a particular file. For example, for the file and trend event described above, an entry would be recorded in the database table as "StartBluetoothEvent, foo.tar.gz, syslog.txt, 06/17/2008."

According to one embodiment, messages may comprise crash data, system logs, and other data, which may comprise data to represent processes that took place prior to the crash happening on the device. These logs comprise raw data which may be searched by the expressions in the event definitions. Using the events received from the searches, trends could be developed for a particular model or particular carrier.

According to one exemplary embodiment, data from one or more mobile devices may be aggregated to assess trends over multiple messages or multiple devices. Data from a plurality of devices may be stored in a single database and various kinds of reports may be generated based on the database.

According to one exemplary embodiment, each event definition may operate according to a plug-in model.

According to one exemplary embodiment, a query may be run against the index before or after changes are made to the index according to additional messages received from device 100.

According to one exemplary embodiment, meaningful text tokens can be extracted from log data, crash data, etc. to allow trends to be identified, and services can be provided based on the trends, usage patterns, etc. User calling patterns and other non-diagnostic events can also be used monitored.

The embodiments disclosed herein have been described with reference to block diagrams and flow diagrams. Each block may represent one or more computer programs (e.g., software, firmware, etc.) and/or the hardware or processing circuitry on which the computer programs operate (e.g., microprocessors, microcontrollers, applications-specific integrated circuits, programmable logic, programmable gate array, etc.). Use of the term module herein may refer to either computer program and/or circuit components operating the computer program to carry out the functions described herein. Modules may interface with other modules at a hardware and/or computer program level, and may operate at and/or interface with other modules at any applicable computer program level specified in the Open Systems Interconnection (OSI) model, such as application layer, presentation layer, session layer, transport layer, network layer, data link, physical layer, etc. Modules may be represented by a block, multiple blocks or portions of blocks in the various figures herein. The recitation of a module, computer, server, or other unit in the specification (including claims) hereof is meant to include the use of multiple units or partial units configured to operate as the unit is described.

The embodiments illustrated in the FIGS and described above are offered by way of example only. Accordingly, the present invention is not limited to a particular embodiment, but extends to various modifications that nevertheless fall within the scope of the appended claims.

What is claimed is:

1. A method of selecting a service for a mobile computing device, comprising:
    receiving a message from the mobile computing device via a wireless network, the message comprising diagnostic data generated in response to a failure of an application on the mobile computing device;
    storing data from the message;
    querying the data to identify a characteristic;
    selecting a service from a plurality of services based on the identified characteristic, the service comprising a software upgrade to the application configured to remedy the failure; and
    sending the selected service to the mobile computing device.

2. The method of claim 1, wherein the data comprises tokens and wherein the step of querying comprises searching for keywords among the tokens to identify the characteristic.

3. The method of claim 1, wherein the stored data comprises log data, further comprising indexing the log data using an information retrieval library.

4. The method of claim 3, wherein querying the data to identify a characteristic comprises:
    selecting attributes of the characteristic to be identified;
    storing the attributes in a database as an event definition; and
    extracting the stored data based on the event definition.

5. The method of claim 4, wherein querying the data to identify a characteristic further comprises aggregating the extracted data and storing the aggregated data in a table.

6. The method of claim 1, wherein the characteristic is selected from the group consisting of a wireless connection failure, a dropped call, a dropped data connection, and a failure of a personal information management application.

7. The method of claim 1, wherein the characteristic is a characteristic of the mobile computing device.

8. The method of claim 1, wherein the characteristic is a characteristic of a model of mobile computing device.

9. The method of claim 1, wherein the characteristic is a characteristic of a wireless carrier associated with the mobile computing device.

10. The method of claim 1, wherein the characteristic is a trend.

11. A system comprising one or more server computers configured to receive a message from the mobile computing device via a wireless network, store data from the message, query the data to identify a characteristic, select a service from a plurality of services based on the identified characteristic, and send the selected service to the mobile computing device, wherein the message comprises diagnostic data generated in response to a failure of an application on the mobile computing device, and the service comprises a software upgrade to the application configured to remedy the failure.

12. The system of claim 11, wherein the characteristic comprises a trend.

13. The system of claim 11, wherein the stored data comprises log data, the one or more server computers configured to index the log data using an information retrieval library, select attributes of the characteristic to be identified, store the attributes in a database as an event definition, and extracting the stored data based on the event definition.

14. A method, comprising:
    receiving messages from a plurality of mobile computing devices via a wireless network, the messages comprising diagnostic data generated in response to a failure of one or more applications on the mobile computing devices;
    indexing data in the messages to generate an index;
    generating a set of attributes;
    querying the index based on the attributes to generate query results;
    selecting a service from a plurality of services based on the query results, the service comprising a software upgrade to the one or more applications configured to remedy the failure; and
    storing the query results in a database.

15. The method of claim 14, wherein the data comprises tokens and wherein the step of querying comprises searching for keywords among the tokens to identify a characteristic.

16. The method of claim 14, wherein the data in the messages comprises log data, wherein the data is indexed using an information retrieval library.

17. The method of claim 14, wherein the set of attributes is generated using a user interface.

18. The method of claim 14, further comprising:
    generating a plurality of additional sets of attributes different than the set of attributes and different than each other; and
    querying the index based on the additional sets of attributes.

19. The method of claim 14, wherein the received messages comprise log data for different events occurring on the plurality of mobile computing devices, wherein the index comprises index data for the different events.

* * * * *